(12) United States Patent
Lee et al.

(10) Patent No.: US 12,716,168 B2
(45) Date of Patent: Aug. 25, 2026

(54) LAUNDRY TREATING APPARATUS

(71) Applicant: LG ELECTRONICS INC., Seoul (KR)

(72) Inventors: Junghwan Lee, Seoul (KR); Youngjong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 18/724,876

(22) PCT Filed: Dec. 8, 2022

(86) PCT No.: PCT/KR2022/019947
§ 371 (c)(1),
(2) Date: Jun. 27, 2024

(87) PCT Pub. No.: WO2023/132497
PCT Pub. Date: Jul. 13, 2023

(65) Prior Publication Data

US 2025/0129540 A1 Apr. 24, 2025

(30) Foreign Application Priority Data

Jan. 5, 2022 (KR) ........................ 10-2022-0001675

(51) Int. Cl.
*D06F 73/02* (2006.01)
*D06F 58/10* (2006.01)
(Continued)

(52) U.S. Cl.
CPC .............. *D06F 73/02* (2013.01); *D06F 58/10* (2013.01); *D06F 58/203* (2013.01); *H02K 7/061* (2013.01); *D06F 2105/46* (2020.02)

(58) Field of Classification Search
CPC ........ D06F 73/02; D06F 58/10; D06F 58/203; D06F 58/12; D06F 58/52; D06F 58/44; D06F 57/00; D06F 69/00
See application file for complete search history.

(56) References Cited

U.S. PATENT DOCUMENTS

| | | | | |
|---|---|---|---|---|
| 7,103,996 | B2 | 9/2006 | Hapke | |
| 2003/0223309 | A1 * | 12/2003 | Hapke | D06F 73/02 366/342 |

(Continued)

FOREIGN PATENT DOCUMENTS

| | | | |
|---|---|---|---|
| EP | 2 592 183 | A1 | 5/2013 |
| KR | 10-2010-0022382 | A | 3/2010 |

(Continued)

*Primary Examiner* — Uyen T Nguyen
(74) *Attorney, Agent, or Firm* — Birch, Stewart, Kolasch & Birch, LLP

(57) ABSTRACT

The present disclosure relates to a laundry treating apparatus including a cabinet having an inlet defined in one surface thereof, a chamber disposed inside the cabinet to provide a space for accommodating laundry therein and in communication with the inlet, supply means supplying at least one of air and moisture to the chamber, a support body located inside the chamber, wherein a clothes hanger is hung inside the support body, a driver allowing the support body to move along at least one of a width direction and a depth direction of the chamber, and vibration controlling means including a fixed body fixed to at least one of the cabinet and the chamber, a mass body positioned below the fixed body, and a connection body having one end connected to the fixed body and the other end connected to the mass body to induce a pendulum motion of the mass body.

10 Claims, 7 Drawing Sheets

(51) Int. Cl.

| | |
|---|---|
| ***D06F 58/20*** | (2006.01) |
| ***D06F 105/46*** | (2020.01) |
| ***H02K 7/06*** | (2006.01) |

(56) References Cited

U.S. PATENT DOCUMENTS

| | | | | |
|---|---|---|---|---|
| 2010/0154486 | A1* | 6/2010 | Kim | D06F 58/10 68/5 C |
| 2011/0296703 | A1* | 12/2011 | Kim | D06F 73/02 34/218 |
| 2013/0086830 | A1* | 4/2013 | Moon | D06F 58/10 38/1 A |

FOREIGN PATENT DOCUMENTS

| | | | |
|---|---|---|---|
| KR | 10-2010-0066411 | A | 6/2010 |
| KR | 10-2010-0073142 | A | 7/2010 |
| KR | 10-1674942 | B1 | 11/2016 |
| KR | 10-2018-0103604 | A | 9/2018 |
| KR | 10-2020-0128984 | A | 11/2020 |
| KR | 10-2021-0052920 | A | 5/2021 |

* cited by examiner

[Fig. 1]
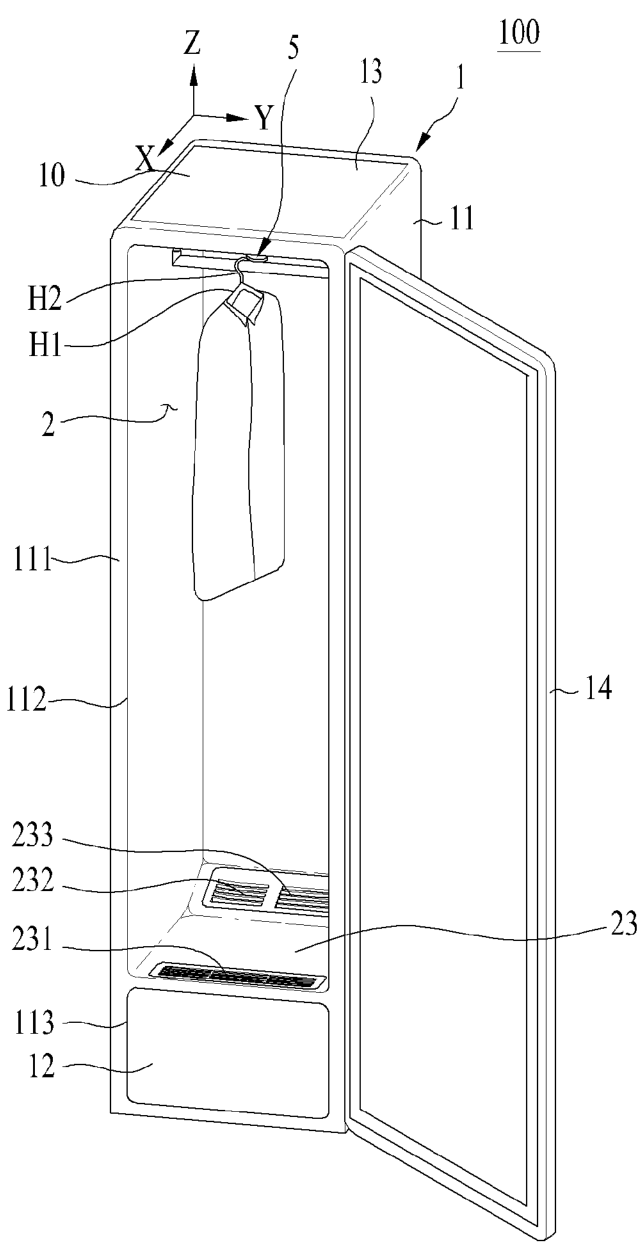

[Fig. 2]
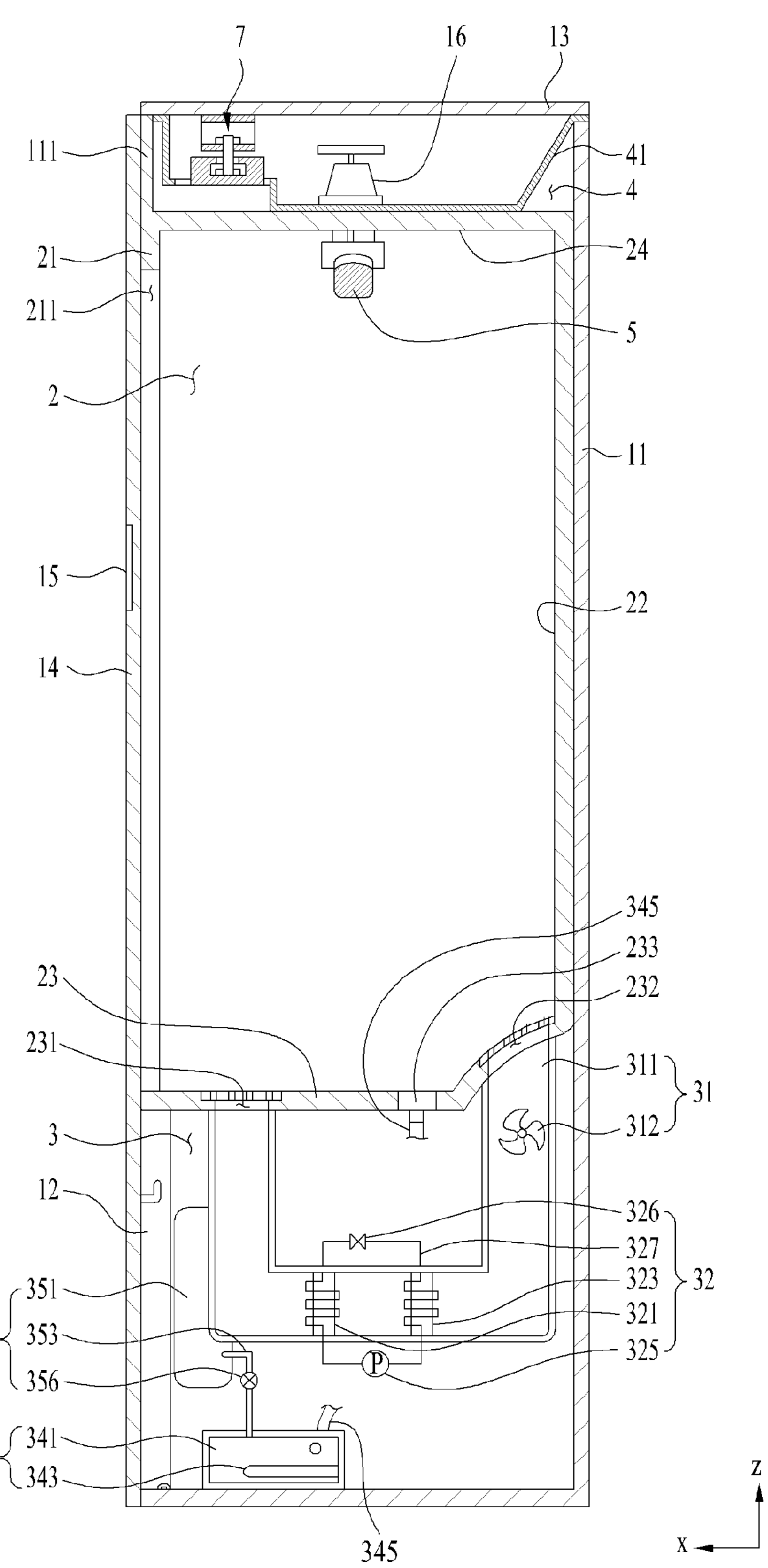

[Fig. 3]
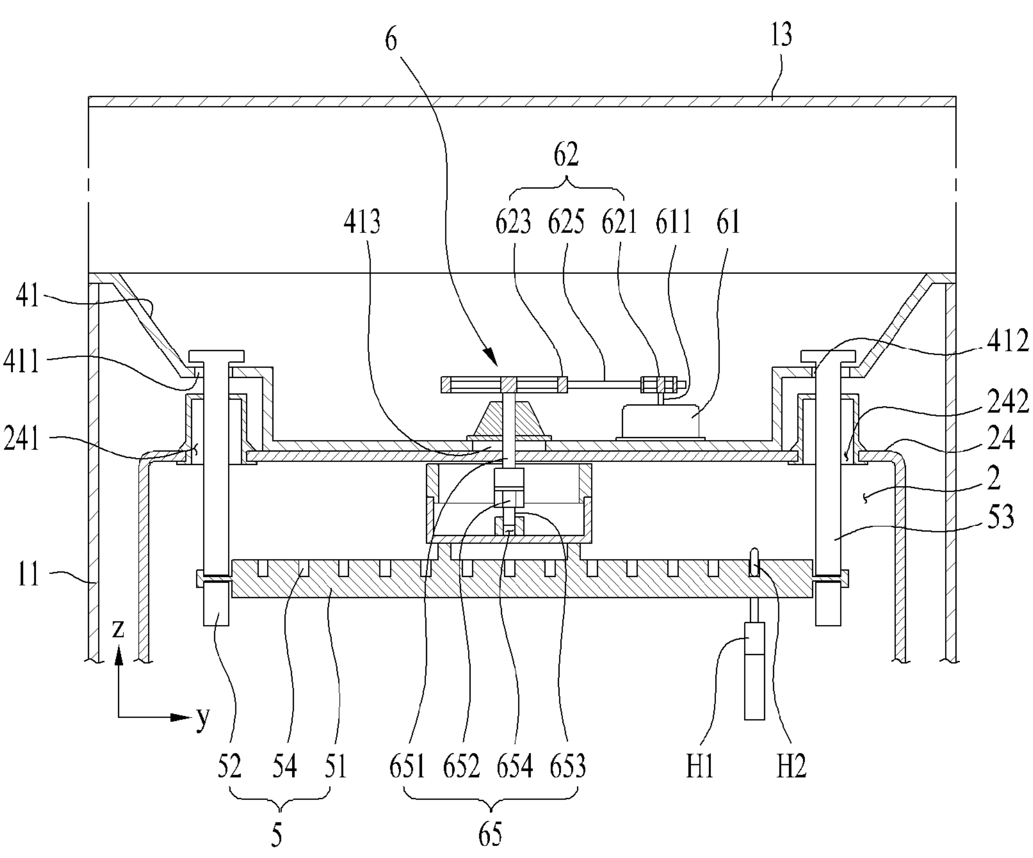
[Fig. 4]
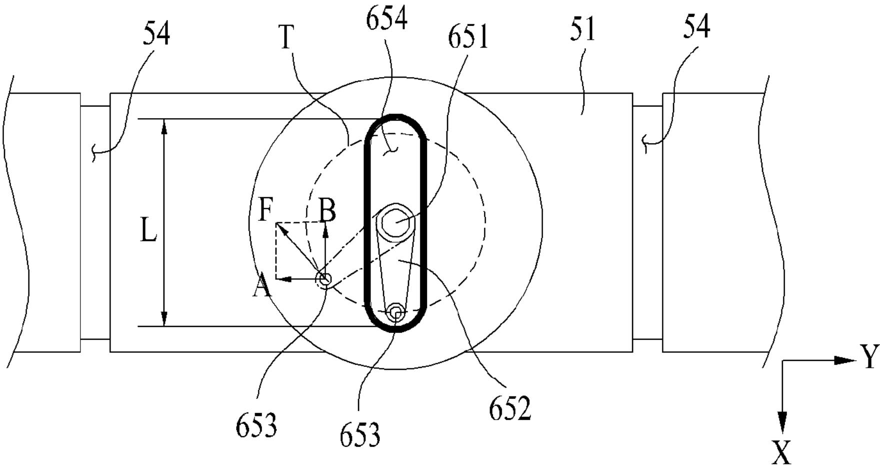

[Fig. 5]
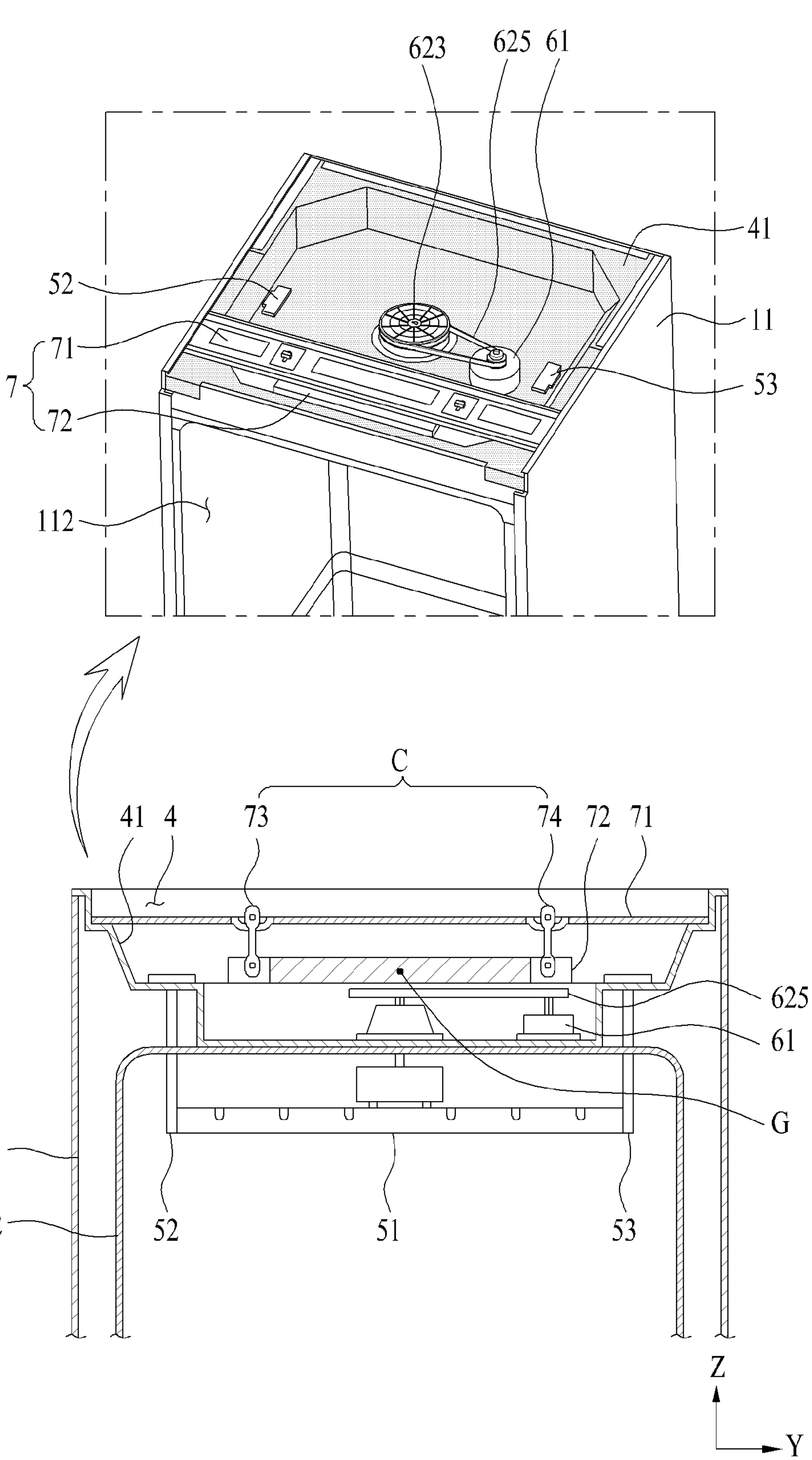

[Fig. 6]
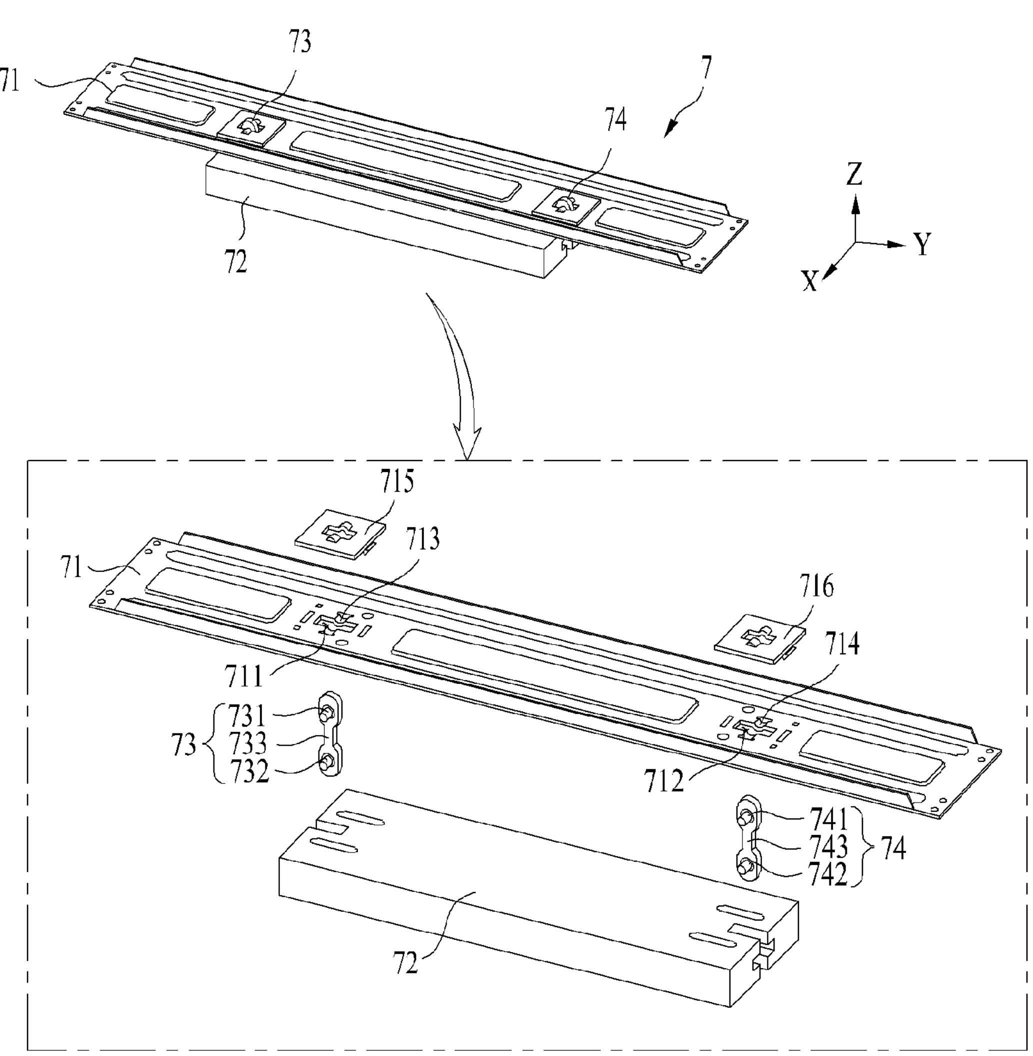

[Fig. 7]
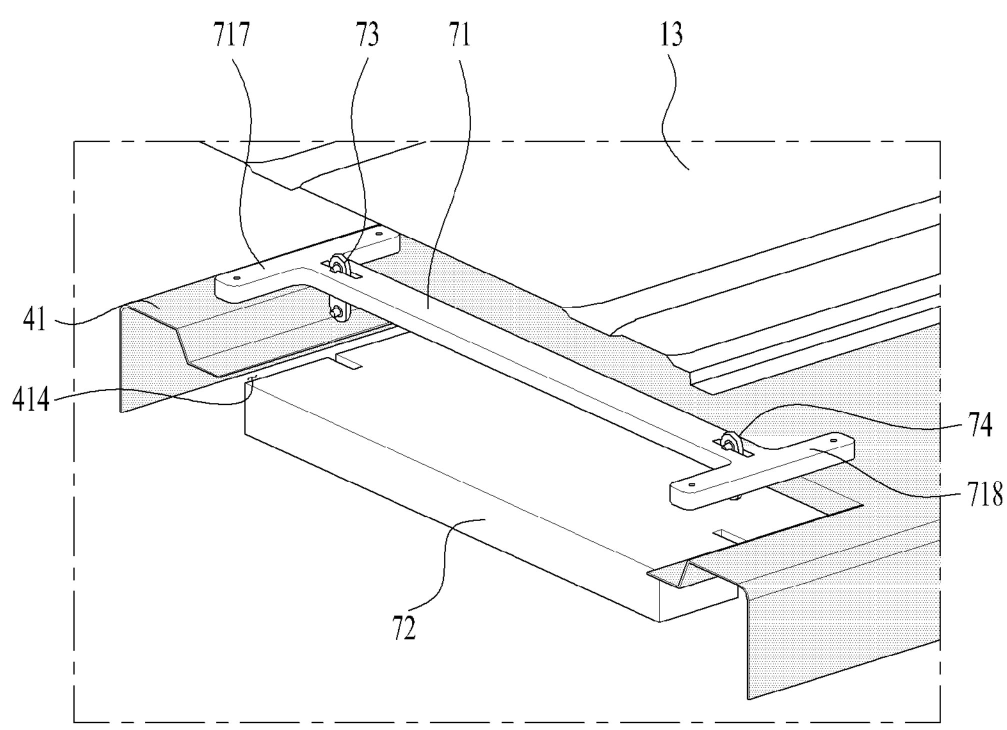

[Fig. 8]
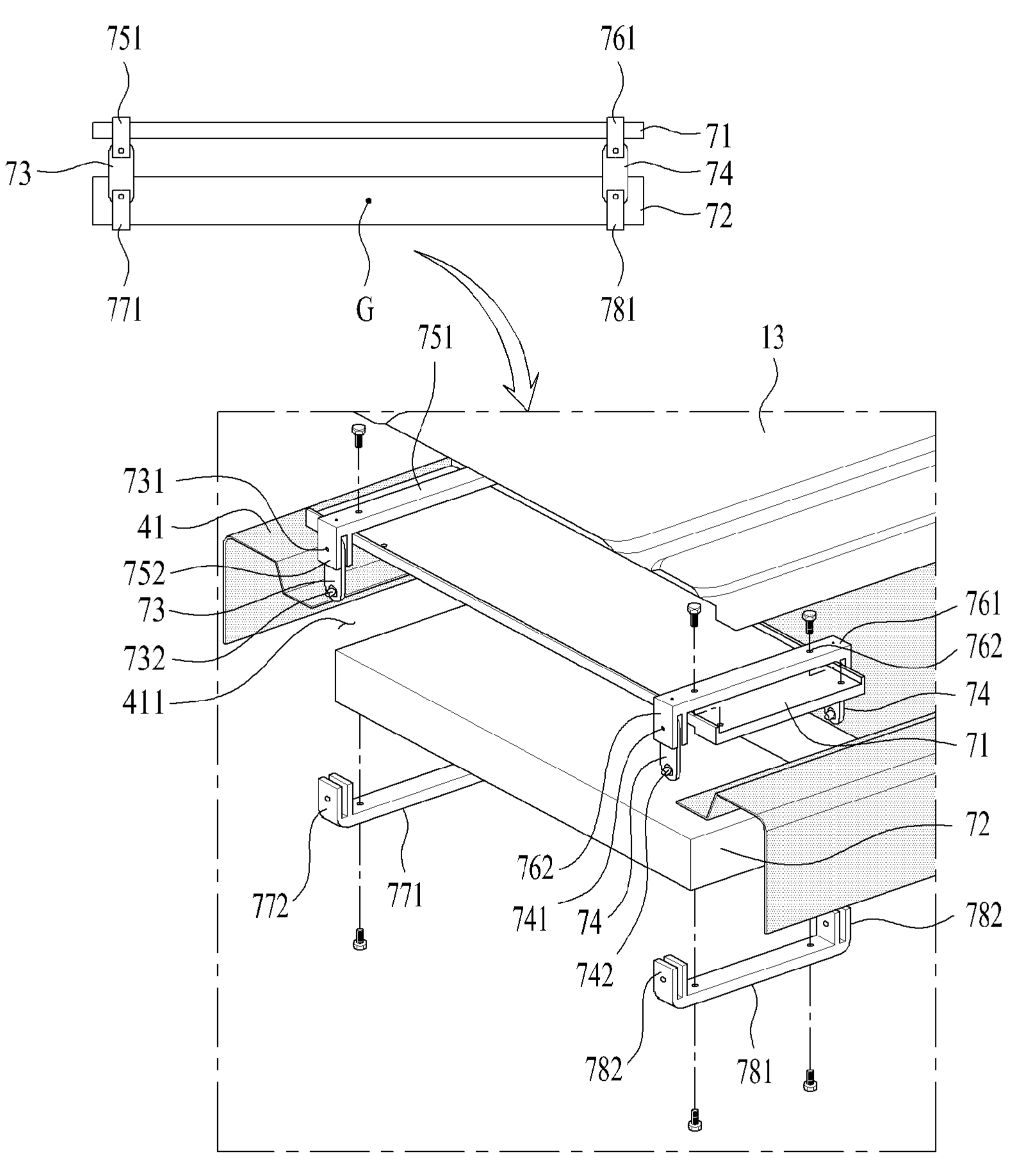

LAUNDRY TREATING APPARATUS

CROSS REFERENCE TO RELATED APPLICATIONS

This application is the National Phase of PCT International Application No. PCT/KR2022/019947, filed on Dec. 8, 2022, which claims priority under 35 U.S.C. 119(a) to Patent Application No. 10-2022-0001675, filed in the Republic of Korea on Jan. 5, 2022, all of which are hereby expressly incorporated by reference into the present application.

TECHNICAL FIELD

The present disclosure relates to a laundry treating apparatus.

BACKGROUND ART

In general, a laundry treating apparatus is an apparatus for performing various tasks related to laundry and is a concept that includes a washing machine for washing the laundry, a dryer for drying the wet laundry, a refresher for removing odors or wrinkles from the laundry, and the like.

Among conventional laundry treating apparatuses, there is one designed to include a drum that provides a space in which the laundry is accommodated, a driver that rotates the drum, and supply means that supplies steam or hot air to the drum. Because steam or hot air must be supplied to the laundry while the drum rotates (because the laundry put into the drum is not in a straightened state), the laundry treating apparatus having the above-described structure has a problem that wrinkles remain on the laundry.

In order to solve such problem, among the conventional laundry treating apparatuses, there is one designed to include a cabinet, a first chamber disposed inside the cabinet so as to provide a space for receiving laundry, a second chamber disposed inside the cabinet and providing a space separated from the first chamber, supply means disposed in the second chamber so as to supply steam or hot air to the first chamber, a support body disposed inside the first chamber so as to hang the laundry inside the first chamber, and a driver that allows the support body to move inside the first chamber (Patent No. 10-1674942).

The laundry treating apparatus having the above-described structure is able to solve the problem of the conventional apparatus (the problem that the wrinkles remain on the laundry) by shaking the laundry in an unfolded state inside the first chamber. However, there is a disadvantage that vibration and noise may occur due to the movement of the support.

Among the conventional laundry treating apparatuses, there is one that controls the vibration by fixing a mass body to the cabinet with an elastic body such as rubber or a spring, and using vibration energy of the cabinet as kinetic energy of the mass body. However, a vibration control apparatus (a dynamic absorber) having a structure of the elastic body and the mass body has a disadvantage in that it is difficult to ensure constant performance of the vibration control apparatus because of a decrease in durability of the rubber or the spring, an assembly tolerance, and the like.

DISCLOSURE OF INVENTION

Technical Problem

The present disclosure is to provide a laundry treating apparatus capable of removing wrinkles and odor of an object-to-be-treated (laundry or the like).

In addition, the present disclosure is to provide a laundry treating apparatus capable of minimizing vibration and noise.

In addition, the present disclosure is to provide a laundry treating apparatus equipped with vibration controlling means capable of easily setting a vibration period and minimizing a decrease in a vibration control performance.

Solution to Problem

Provided is a laundry treating apparatus including a cabinet having an inlet defined in one surface thereof, a chamber disposed inside the cabinet so as to provide a space for accommodating laundry therein and in communication with the inlet, supply means for supplying at least one of air and moisture to the chamber, a support body located inside the chamber, wherein a clothes hanger is hung inside the support body, a driver for allowing the support body to move along at least one of a width direction of the chamber and a depth direction of the chamber, and vibration controlling means including a fixed body fixed to at least one of the cabinet and the chamber, a mass body positioned below the fixed body, and a connection body having one end connected to the fixed body and the other end connected to the mass body so as to induce a pendulum motion of the mass body.

The connection body may connect the mass body and the fixed body to each other such that the mass body moves in the same direction as a movement direction of the support body.

A period of the pendulum motion of the mass body may be set equal to a reciprocating period of the support body.

The driver may include a motor and conversion means for converting a rotational motion of a driving shaft disposed in the motor into a linear reciprocating motion of the support body, and a period of the pendulum motion of the mass body may be set equal to the number of rotations set in the driving shaft.

The connection body may include a first link for connecting a region located on a left side of a center of the mass body to the fixed body, and a second link for connecting a region located on a right side of the center of the mass body to the fixed body.

The laundry treating apparatus may further include a first mounting portion defined inside the cabinet so as to provide a space for the supply means to be mounted, wherein the first mounting portion is located beneath the chamber, and a second mounting portion defined inside the cabinet so as to provide a space for the vibration controlling means to be mounted, wherein the second mounting portion is located on the chamber.

The laundry treating apparatus may further include a mounting body fixed to the cabinet and positioned in the second mounting portion, a first connection bar extending through the chamber so as to connect one end of the support body to the mounting body, and a second connection bar extending through the chamber so as to connect the other end of the support body to the mounting body.

The driver may include a motor fixed to the mounting body and conversion means for converting a rotational motion of a driving shaft disposed in the motor into a linear reciprocating motion of the support body.

The driver may further include transmission means for transmitting the rotational motion of the driving shaft to the conversion means.

The conversion means may include a rotation shaft having one end located in the second mounting portion and the other end located inside the chamber, an arm fixed orthogonally to the rotation shaft, a slot defined in the support body in a direction orthogonal to the movement direction of the support body, and a fastening portion disposed on the arm and inserted into the slot, and the transmission means may include a driving pulley fixed to the driving shaft, a driven pulley fixed to the rotation shaft, and a belt for connecting the driving pulley and the driven pulley to each other.

The connection body may include an upper first fixed plate fixed to the fixed body and disposed on a left side of a center of the mass body, upper first support plates extending toward the mass body from both ends of the upper first fixed plate, an upper second fixed plate fixed to the fixed body and disposed on a right side of the center of the mass body, upper second support plates extending toward the mass body from both ends of the upper second fixed plate, a lower first fixed plate fixed to the mass body and disposed on the left side of the center of the mass body, lower first support plates extending toward the mass body from both ends of the lower first fixed plate, a lower second fixed plate fixed to the mass body and disposed on the right side of the center of the mass body, lower second support plates extending toward the mass body from both ends of the lower second fixed plate, a pair of first links constructed to connect the upper first support plate and the lower first support plate to each other, and a pair of second links constructed to connect the upper second support plate and the lower second support plate to each other.

Advantageous Effects of Invention

The present disclosure is to provide the laundry treating apparatus capable of removing the wrinkles and the odor of the object-to-be-treated (the laundry or the like).

In addition, the present disclosure is to provide the laundry treating apparatus capable of minimizing the vibration and the noise.

In addition, the present disclosure is to provide the laundry treating apparatus equipped with the vibration controlling means capable of easily setting the vibration period and minimizing the decrease in the vibration control performance.

BRIEF DESCRIPTION OF DRAWINGS

FIGS. 1 and 2 show an example of a laundry treating apparatus.

FIG. 3 shows an example of a support and a driver disposed in a laundry treating apparatus.

FIG. 4 shows an example of conversion means disposed in a driver.

FIGS. 5 and 6 show an example of vibration controlling means.

FIGS. 7 and 8 show another embodiment of vibration controlling means.

BEST MODE FOR CARRYING OUT THE INVENTION

Reference will now be made in detail to the preferred embodiments of the present disclosure, examples of which are illustrated in the accompanying drawings. Meanwhile, elements or control method of apparatuses which will be described below are only intended to describe the embodiments of the present disclosure and are not intended to restrict the scope of the present disclosure. Wherever possible, the same reference numbers will be used throughout the drawings to refer to the same or like parts.

Hereinafter, a preferred embodiment of the present disclosure will be described in detail with reference to the accompanying drawings.

As shown in FIG. 1, a laundry treating apparatus 100 is constructed to include a cabinet 1, a chamber 2 disposed inside the cabinet so as to provide therein a space for an object-to-be-dried such as laundry to be accommodated, and vibrating means 5 and 6 that make the laundry vibrate (or reciprocate) in an unfolded state inside the chamber 2.

The cabinet 1 may be constructed to include a body 11 that provides a space in which the chamber 2 is accommodated. A front surface 111 of the body 11 has an inlet 112 in communication with the chamber 2. The inlet 112 may be opened and closed by a door 14 pivotably fixed to the body 11.

As shown in FIG. 2, a control panel 15 may be disposed on the door 14. The control panel 15 may have input means for receiving a control command required for operation of the laundry treating apparatus 100 from a user, and display means for displaying a control command selectable by the user and an execution process of the control command selected by the user.

The chamber 2 is means for providing the space in which the laundry is accommodated by being fixed to the body 11. The chamber 2 may include a chamber front surface 21, a chamber top surface 24 fixed to an upper end of the chamber front surface so as to form a top surface of the chamber, a chamber bottom surface 23 fixed to a lower end of the chamber front surface so as to form a bottom surface of the chamber, and a chamber rear surface 22 that connects a rear end of the chamber top surface and a rear end of the bottom surface to each other.

The chamber front surface 21 is a surface disposed to face the front surface 111 of the cabinet. The chamber front surface 21 may have an inlet communication hole 211 connected to the inlet 112.

A first mounting portion (machine room) 3 may be defined beneath the chamber bottom surface 23, and a second mounting portion 4 may be defined on the chamber top surface 24. The chamber bottom surface 23 may be means for distinguishing the chamber 2 and the first mounting portion 3 from each other, and the chamber top surface 24 may be means for distinguishing the chamber 2 and the second mounting portion 4 from each other. Unlike as shown in the drawing, the first mounting portion 3 and the second mounting portion 4 may be defined outside the cabinet 1.

As shown in FIG. 1, the front surface 111 of the cabinet has a communication hole (first communication hole) 113 in communication with the first mounting portion 3. The first communication hole 113 may be opened and closed by a first cover 12. A second communication hole in communication with the second mounting portion 4 is defined in the top surface of the cabinet 1. The second communication hole may be opened and closed by a second cover 13.

An exhaust hole 231, an air supply hole 232, and a moisture supply hole 233 for communicating the chamber 2 and the first mounting portion 3 to each other may be defined in the chamber bottom surface 23.

The exhaust hole 231 may be a flow channel for discharging air inside the chamber 2 to the first mounting portion 3, and the air supply hole 232 and the moisture supply hole 233 may be defined as flow channels for supplying air and moisture supplied from supply means 31, 32, 34, and 35 disposed in the first mounting portion 3 to the chamber 2.

The supply means 31, 32, 34, and 35 may include at least one of the air supply means 31 and the moisture supply means 34. FIG. 2 shows a case in which the supply means include both of the air supply means 31 and 32 and the moisture supply means 34 and 35.

The air supply means is means for supplying air to the chamber 2. The air supply means may include a duct 311 for connecting the exhaust hole 231 and the air supply hole 232 to each other, and a fan 312 disposed inside the duct 311.

When the air supply means is constructed to supply heated air to the chamber 2, the heat exchanging means 32 may be further disposed inside the duct 311.

The heat exchanging means 32 includes a first heat exchanger (evaporator) 321 that absorbs heat from the air introduced into the duct 311 and condenses the air, and a second heat exchanger (condenser) 323 that heats air by supplying heat to the air that has passed through the first heat exchanger. The first heat exchanger and the second heat exchanger are connected to each other via a refrigerant pipe 327 forming a circulation flow channel of a refrigerant. The refrigerant pipe 327 includes a compressor 325 for compressing the refrigerant and a pressure regulator 326 for adjusting a pressure of the refrigerant circulating along the refrigerant pipe.

The moisture supply means may include a storage 341 in which water is stored, a heater 343 disposed inside the storage so as to heat water, and a supply pipe 345 for guiding steam inside the storage 341 to the moisture supply hole 233. The heater 343 may be formed as an electrical resistor that generates heat when power is supplied thereto.

The storage 341 may be constructed to receive water from the water supply means 35 disposed on the first cover 12. That is, the water supply means 35 may include a tank 351 constructed to be detachable from the first cover 12 and storing water therein, a connection pipe 353 for connecting the tank 351 to the storage 341, and a valve 355 for controlling opening and closing of the connection pipe.

The vibrating means 5 and 6 may include the support 5 that allows the laundry to maintain the unfolded state inside the chamber 2 by providing a space in which a clothes hanger is hung, and the driver 6 that generates power required to move the support 5.

As shown in FIG. 3, the support 5 may include a support body 51 located inside the chamber 2 and in which a clothes hanger H1 is hung.

The support body 51 may be formed as a bar parallel to a width direction (a Y-axis direction) of the chamber. A plurality of accommodating grooves 54 for accommodating hooks H2 of the clothes hangers therein may be defined in a top surface (a surface facing the chamber top surface) of the support body 51.

One end of the support body 51 may be connected to the chamber top surface 24 via a first connection bar 52, and the other end of the support body 51 may be connected to the chamber top surface 24 via a second connection bar 53. In order to minimize restriction of a movement of the support body 51 by the connection bars 52 and 53, the first connection bar 52 and the second connection bar 53 are preferably made of an elastic material such as rubber.

The first connection bar 52 and the second connection bar 53 may be constructed to be directly fixed to the chamber top surface 24 or may be constructed to be fixed to a mounting body 41 disposed in the second mounting portion 4. When each of the connection bars 52 and 53 is fixed to the mounting body 41 instead of directly to the chamber top surface 24, vibration transmitted to the chamber 2 during the movement of the support body 51 will be able to be reduced.

When each of the connection bars 52 and 53 is fixed to the mounting body 41, a first through-hole 241 through which the first connection bar 52 passes and a second through-hole 242 through which the second connection bar 53 passes must be defined in the chamber top surface 24, and a first mounting hole 411 into which the first connection bar 52 is fixed and a second mounting hole 412 into which the second connection bar 53 is fixed must be defined in the mounting body 41.

In order to prevent the air or the moisture supplied to the chamber 2 from being discharged to the second mounting portion 4, it is preferable that each of the through-holes 241 and 242 has a gasket. As long as each through-hole may be closed, the gasket may have various shapes or structures.

The support body 51 reciprocates inside the chamber 2 via the driver 6. As used herein, the meaning of the 'reciprocating motion' is a concept that includes a case in which the support body 51 moves to form a circular or elliptical trajectory on a X-Y plane as well as a linear motion of the support body reciprocating along an X-axis (a motion along a depth direction of the chamber) or a linear motion reciprocating along a Y-axis (a motion along the width direction of the chamber).

The driver 6 may include a motor 61 having a driving shaft 611, conversion means 65 for converting a rotational motion into the linear reciprocating motion of the support body 51, and transmission means 62 for transmitting a rotational motion of the driving shaft 611 to the conversion means 65. The motor 61 may be fixed to the mounting body 41.

The conversion means 65 may include a rotation shaft 651 having one end located in the second mounting portion 4 and the other end located inside the chamber 2, an arm 652 fixed orthogonally to the rotation shaft, a slot 654 defined in the support body 51 in a direction orthogonal to the movement direction of the support body 51, and a fastening portion 653 disposed on the arm 652 and inserted into the slot 654. A shaft receiving hole 413 through which the rotation shaft 651 passes and a chamber through-hole may be defined in the mounting body 41 and the chamber top surface 24, respectively.

The transmission means 62 may be composed of driving means fixed to the driving shaft 611 and driven means 623 fixed to the rotation shaft 651.

The driving means may be formed as a driving gear fixed to the driving shaft 611, and the driven means may be formed as a driven gear fixed to the rotation shaft 651 and meshed with the driving gear.

Unlike the above, the driving means 621 may be formed as the driving pulley 621 fixed to the driving shaft 611, and the driven means 623 may be formed as the driven pulley fixed to the rotation shaft 651. In this case, the driving pulley and the driven pulley should be connected to each other via a belt 625.

As shown in FIG. 4, when the driving shaft 611 rotates, a free end of the arm 652 fixed to one end of the rotation shaft 651 will rotate inside the chamber 2. Because the fastening portion 653 is disposed at the free end of the arm 652 and the slot 654 is defined in the direction (the X-axis direction) orthogonal to the movement direction of the support body 51, the motion of the support body 51 is determined by a length L of the slot 654 and a diameter of a rotational trajectory T of the fastening portion 653.

That is, when the length L of the slot 654 is set to be equal to or greater than a diameter of the rotational trajectory T of the fastening portion 653, the support body 51 will linearly reciprocate along the width direction (the Y-axis direction) of the chamber 2 when the arm 652 rotates. On the other hand, when the length L of the slot 654 is set to be smaller than the diameter of the rotational trajectory T of the fastening portion, the support body 51 will reciprocate to form the elliptical trajectory on the X-Y plane when the arm 652 rotates.

Unlike shown in the drawing, the slot 624 may be defined along a direction (the Y-axis direction) parallel to a longitudinal direction of the support body 51. In this case, when the length L of the slot is set to be equal to or greater than the diameter of the rotational trajectory T of the fastening portion, the support body 51 will linearly reciprocate along the depth direction of the chamber 2 (the X-axis direction) (preferably, positions of connection bodies and the through-holes are changed) when the arm 652 rotates. However, when the length L of the slot is set to be smaller than the diameter of the rotational trajectory T of the fastening portion, the support body 51 will reciprocate to form the elliptical trajectory on the X-Y plane when the arm 652 rotates.

The laundry treating apparatus 100 having the above-described structure may shake the support body 51 when the rotation shaft 651 rotates, thereby removing dust in addition to odor particles from the laundry accommodated in the chamber 2. In addition, when the support body 51 is shaken while the air or the moisture is supplied via the supply means 31, 32, 34, and 35, an effect of removing wrinkles on the laundry may also be expected.

However, in the laundry treating apparatus 100 of the structure composed only of the above-described components, as a reciprocating cycle of the support body 51 becomes shorter, the vibration of the chamber 2 may increase. In order to minimize the vibration of the chamber 2 caused by the motion of the support body 51, the support 5 may further include vibration controlling means 7 for suppressing the vibration caused by the support body 51.

As shown in FIG. 5, the vibration controlling means 7 may disposed on the second mounting portion 4.

The vibration controlling means 7 may include a fixed body 71 fixed to at least one of the cabinet 1 and the chamber 2, a mass body 72 positioned below the fixed body 71, and a connection body c having one end connected to the fixed body 71 and the other end connected to the mass body 72.

Although FIG. 5 shows a case in which the fixed body 71 is fixed to the cabinet 1 via the mounting body 41, the fixing body 71 may be fixed to the chamber top surface 24 via a separate bracket or the like.

The connection body c is means for inducing a pendulum motion of the mass body 72. The connection body c may be formed as a bar as shown in the drawing. The connection body c is preferably constructed to connect the mass body 72 and the fixed body 71 to each other such that the mass body 72 moves along the same direction as the movement direction (the Y-axis direction) of the support body 51.

The connection body c may include a first link 73 for connecting a region located on a left side of a center G of the mass body 72 to the fixed body 71, and a second link 74 for connecting a region located on a right side of the center G of the mass body to the fixed body 71. That is, the first link 73 and the second link 74 are disposed along a longitudinal direction (the Y-axis direction) of the mass body, and preferably disposed to face each other with the center G of the mass body interposed therebetween.

As shown in FIG. 6, the first link 73 may include a first bar 733, a first link first shaft 731 disposed at one end of the first bar, and a first link second shaft 732 disposed at the other end of the first bar.

The first bar 733 may be pivotably connected to the fixed body 71 via the first link first shaft 731 and pivotably connected to the mass body 72 via the first link second shaft 732. The first link first shaft 731 may be rotatably fixed to the first bar 733 via a first link first bearing, and the first link second shaft 732 may be rotatably fixed to the first bar 733 via a first link second bearing.

Similarly, the second bar 743 may be pivotably connected to the fixed body 71 via a second link first shaft 741 and may be pivotably connected to the mass body 72 via a second link second shaft 742. The second link first shaft 741 may be rotatably fixed to the second bar 743 via a second link first bearing, and the second link second shaft 742 may be rotatably fixed to the second bar 743 via a second link second bearing.

The fixed body 71 includes a fixed body first through-hole 711 through which the first bar 733 passes and a fixed body second through-hole 712 through which the second bar 743 passes.

A first groove 713 into which the first link first shaft 731 is mounted may be defined at an edge of the fixed body first through-hole 711, and a second groove 714 into which the second link first shaft 741 is mounted may be defined at an edge of the fixed body second through-hole 712.

In order to prevent the first link first shaft 731 from departing from the first groove 713 and the second link first shaft 741 from departing from the second groove 714, the vibration controlling means 7 may further include a first link fixing portion 715 and a second link fixing portion 716 detachably fixed to the fixed body 71.

In the vibration controlling means 7 described above, when the vibration occurs in the cabinet 1 or the chamber 2, the mass body 72 performs the pendulum motion. That is, because the vibration controlling means 7 has a structure that consumes the vibration occurred in the cabinet 1 or the chamber 2 as pendulum kinetic energy of the mass body 72, the laundry treating apparatus 100 having the above-described structure is able to minimize the vibration of the cabinet.

In one example, in order to effectively attenuate the vibration of the laundry treating apparatus 1, a period of the pendulum motion of the mass body 72 may be set equal to the reciprocating period of the support body 51 and may be set equal to the number of rotations of the driving shaft 611 of the motor.

The period of the pendulum motion of the mass body 72 is determined by a distance between the two shafts 731 and 732 disposed in the first link 73 (a distance between the two shafts disposed in the second link), and a vibration period of the mass body does not change unless the shafts disposed in each link are damaged. Therefore, the vibration controlling means 7 of the above-described structure has the advantageous effect on attenuating the vibration in a preset band for a long period of time compared to the rubber, the spring, or the like whose vibration control performance is degraded as durability decreases (as physical properties change over time).

That is, among the conventional laundry treating apparatuses, there is one that controls the vibration by fixing the mass body to the cabinet with the elastic body such as the rubber or the spring. In the laundry treating apparatus that makes the mass body vibrate with the rubber, the spring, or the like, there may be a problem that a controllable range of the vibration is changed because of the decrease in the durability of the rubber or the spring, an assembly tolerance, and the like (a problem that it is difficult to maintain constant vibration control performance). In the above-described vibration controlling means 7, because the vibration period of the mass body is determined only by the distance between the two shafts disposed in each link, it is possible to minimize the above-mentioned problem occurring in the conventional laundry treating apparatus.

Furthermore, the vibration controlling means of the scheme that attenuates the vibration via the pendulum motion of the mass body has an effect of reducing a weight of the mass body compared to the scheme that fixes the mass body to the cabinet via the elastic body.

FIG. 7 shows another embodiment of the vibration controlling means 7. The vibration controlling means 7 according to the present embodiment is characterized in that the fixed body 71 is fixed to the mounting body 41 via a first fastening body 717 and a second fastening body 718.

The fixed body 71 may be formed as a bar parallel to the width direction of the chamber 2, and the first fastening body 717 and the second fastening body 718 may be formed as bars fixed so as to be orthogonal to the fixed body 71.

The mass body 72 is connected to the fixed body 71 via the first link 73 and the second link 74. Structures of the mass body and the links may be identical to the structures of the mass body and the links in the embodiment of FIG. 6 described above.

In order to prevent the mass body 72 from interfering with the mounting body 41, a mounting body through-hole 414 may be further defined in a region of the mounting body 41 located below the mass body 72.

FIG. 8 shows another embodiment of the vibration controlling means 7. The vibration controlling means 7 according to the present embodiment is also composed of the fixed body 71 fixed to the mounting body 41 and the mass body 72 connected to the fixed body 71 via the connection body c.

The connection body c in the present embodiment is constructed to include an upper first fixed plate 751 and an upper second fixed plate 761 fixed to the fixed body 71 and disposed on the left and right sides of the center G of the mass body 72, respectively, and a lower first fixed plate 771 and a lower second fixed plate 781 fixed to the left and right sides of the center G of the mass body, respectively. The upper first fixed plate 751 and the upper second fixed plate 761 may be fixed to the fixed body 71 via fasteners such as bolts, and the lower first fixed plate 771 and the lower second fixed plate 781 may be fixed to the mass body 72 via the fasteners such as the bolts.

Upper first support plates 752 extending toward the mass body 72 are disposed at both ends of the upper first fixed plate 751, and upper second support plates 762 extending toward the mass body 72 are disposed at both ends of the upper second fixed plate 761. Similarly, lower first support plates 772 extending toward the mass body are disposed at both ends of the lower first fixed plate 771, and lower second support plates 782 extending toward the mass body 72 are disposed at both ends of the lower second fixed plate 781.

The upper first support plates 752 and the lower first support plates 772 are connected to each other via a pair of first links 73, and the upper second support plates 762 and the lower second support plates 782 are connected to each other via a pair of second links 74.

The first link 73 may be connected to the upper first support plate 752 via a first link first shaft 731, and may be connected to the lower first support plate 772 via a first link second shaft 732. The second link 74 may be connected to the upper second support plate 762 via a second link first shaft 741, and may be connected to the lower second support plate 782 via a second link second shaft 742.

Because the structure or the control method of the laundry treating apparatus described above relates to the embodiment, the scope of rights of the present disclosure is not limited to the above-described embodiment.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

The invention claimed is:

1. A laundry treating apparatus comprising:

a cabinet having an inlet defined in one surface of the cabinet;

a chamber disposed inside the cabinet so as to provide a space for accommodating laundry in the chamber and in communication with the inlet;

supply means for supplying at least one of air and moisture to the chamber;

a support body located inside the chamber, wherein a clothes hanger is hung inside the support body;

a driver configured to allow the support body to move along at least one of a width direction of the chamber and a depth direction of the chamber; and vibration controlling means including a fixed body fixed to at least one of the cabinet and the chamber, a mass body positioned below the fixed body, and a connection body having a first end connected to the fixed body and a second end connected to the mass body, wherein the vibration controlling means is configured to reduce vibration occurring in the cabinet or the chamber through pendulum motion of the mass body.

2. The laundry treating apparatus of claim 1, wherein the connection body connects the mass body and the fixed body to each other such that the mass body moves in the same direction as a movement direction of the support body.

3. The laundry treating apparatus of claim 2, wherein a period of the pendulum motion of the mass body is set equal to a reciprocating period of the support body.

4. The laundry treating apparatus of claim 2, wherein the driver includes a motor and conversion means for converting a rotational motion of a driving shaft disposed in the motor into a linear reciprocating motion of the support body, wherein a period of the pendulum motion of the mass body is set equal to a number of rotations set in the driving shaft.

5. The laundry treating apparatus of claim 2, wherein the connection body includes a first link for connecting a region located on a left side of a center of the mass body to the fixed body, and a second link for connecting a region located on a right side of the center of the mass body to the fixed body.

6. The laundry treating apparatus of claim 5, further comprising:

a first mounting portion defined inside the cabinet so as to provide a space for the supply means to be mounted, wherein the first mounting portion is located beneath the chamber; and a second mounting portion defined inside the cabinet so as to provide a space for the vibration controlling means to be mounted, wherein the second mounting portion is located on the chamber.

7. The laundry treating apparatus of claim 6, further comprising:

a mounting body fixed to the cabinet and positioned in the second mounting portion;

a first connection bar extending through the chamber so as to connect a first end of the support body to the mounting body; and a second connection bar extending through the chamber so as to connect a second end of the support body to the mounting body, wherein the driver includes a motor fixed to the mounting body and conversion means for converting a rotational motion of a driving shaft disposed in the motor into a linear reciprocating motion of the support body.

8. The laundry treating apparatus of claim 7, wherein the driver further includes transmission means for transmitting the rotational motion of the driving shaft to the conversion means.

9. The laundry treating apparatus of claim 8, wherein the conversion means includes a rotation shaft having a first end located in the second mounting portion and a second end located inside the chamber, an arm fixed orthogonally to the rotation shaft, a slot defined in the support body in a direction orthogonal to the movement direction of the support body, and a fastening portion disposed on the arm and inserted into the slot, wherein the transmission means includes a driving pulley fixed to the driving shaft, a driven pulley fixed to the rotation shaft, and a belt for connecting the driving pulley and the driven pulley to each other.

10. The laundry treating apparatus of claim 2, wherein the connection body includes:

an upper first fixed plate fixed to the fixed body and disposed on a left side of a center of the mass body;

upper first support plates extending toward the mass body from both ends of the upper first fixed plate;

an upper second fixed plate fixed to the fixed body and disposed on a right side of the center of the mass body;

upper second support plates extending toward the mass body from both ends of the upper second fixed plate;

a lower first fixed plate fixed to the mass body and disposed on the left side of the center of the mass body;

lower first support plates extending toward the mass body from both ends of the lower first fixed plate;

a lower second fixed plate fixed to the mass body and disposed on the right side of the center of the mass body;

lower second support plates extending toward the mass body from both ends of the lower second fixed plate;

a pair of first links constructed to connect an upper first support plate of the upper first support plates and a lower first support plate of the lower first support plates to each other; and a pair of second links constructed to connect an upper second support plate of the upper second support plates and a lower second support plate of the lower second support plates to each other.

* * * * *